United States Patent [19]

Lim

[11] Patent Number: 5,119,177

[45] Date of Patent: Jun. 2, 1992

[54] AUTOMATIC 3-MODE SWITCHING CIRCUIT OF A COLOR TELEVISION SET

[75] Inventor: Byung J. Lim, Kyungsangbook, Rep. of Korea

[73] Assignee: Goldstar Co., Ltd., Seoul, Rep. of Korea

[21] Appl. No.: 560,737

[22] Filed: Jul. 31, 1990

[30] Foreign Application Priority Data

Jul. 31, 1989 [KR] Rep. of Korea ............... 11318/1989

[51] Int. Cl.$^5$ .............................................. H04N 5/46
[52] U.S. Cl. ...................................... 358/21 R; 358/11
[58] Field of Search ................................ 358/11, 21 R

[56] References Cited

U.S. PATENT DOCUMENTS

| | | | |
|---|---|---|---|
| 4,414,563 | 11/1983 | Juhnke et al. | 358/21 R |
| 4,688,082 | 8/1987 | Kato | 358/21 R |
| 4,933,749 | 6/1990 | Van Lammeren et al. | 358/11 |

FOREIGN PATENT DOCUMENTS

| | | | |
|---|---|---|---|
| 52684 | 4/1980 | Japan | 358/11 |
| 80992 | 5/1983 | Japan | 358/11 |

*Primary Examiner*—John W. Shepperd

[57] ABSTRACT

An automatic 3-mode switching circuit of a color television set for automatically changing into a suitable system according to broadcasting signals of the broadcasting systems, i.e., PAL-N, NTSC, PAL-M systems, which comprises a color killing section, a color existence/non-existence discriminating section, a vertical synchronization signal processing section, a 50/60 Hz discriminating section, a control section, a switching section, a NTSC color demodulating section and a NTSC oscillation section, a PAL-M color demodulating section, a PAL-N color demodulating section and a PAL-N oscillation section, and a voltage controlling section.

2 Claims, 3 Drawing Sheets

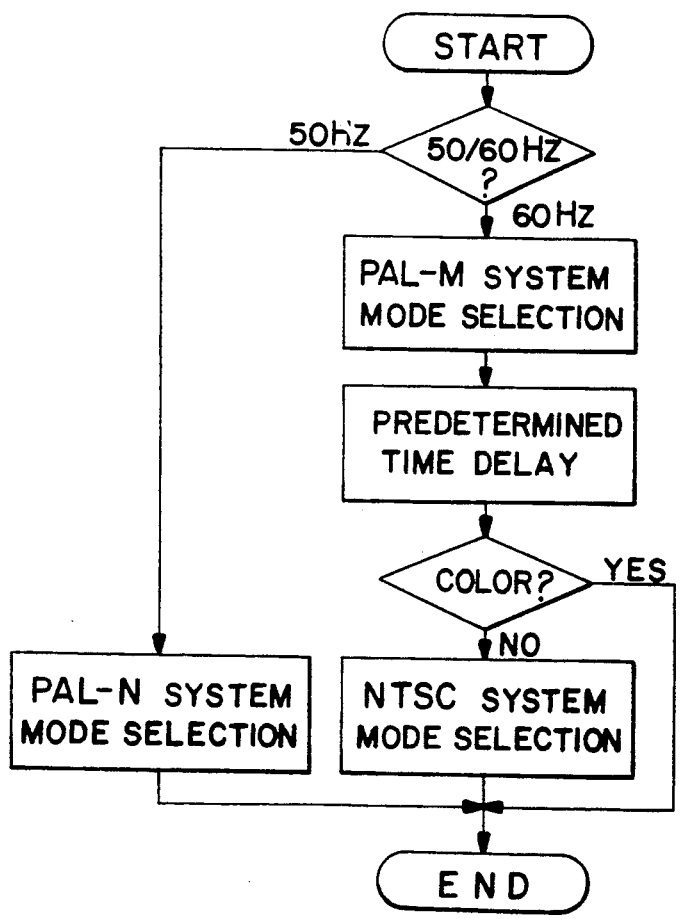

AUTOMATIC 3-MODE SWITCHING CIRCUIT OF A COLOR TELEVISION SET

BACKGROUND OF THE INVENTION

1. Field of the Invention

The present invention relates to a mode switching circuit of a color television set which switches to a suitable mode according to each of the broadcasting systems of PAL-N, NTSC, and PAL-M.

2. Description of the Prior Art

Various types of NTSC, PAL-M and PAL-N systems for television broadcasting systems are well known in the art, and a broadcasting system is different from country to country. Especially, the countries in the Central and South America have different broadcasting systems even though they are adjacent to one another. Each of the television broadcasting systems have its own vertical synchronization frequency and color demodulating process, thereby catching the television broadcasting normally only with a television set suitable for the television broadcasting system. Accordingly, circuits for the mode selection are built in the conventional color television set so that one can select a suitable mode according to a television broadcasting system.

Since the PAL-M and NTSC systems have a vertical synchronization frequency of a 60 Hz and the PAL-N system has that of a 50 Hz, the PAL-N system can be distinguished by detecting the vertical synchronization frequency but the PAL-M system cannot be distinguished from the NTSC system. That is, when a detected vertical synchronization frequency is a 50 Hz, the PAL-N system is determined and the mode suitable for the system can be selected. However, when a 60 Hz is detected as a vertical synchronization frequency, it is recognized to be both of the PAL-M and the NTSC systems.

Accordingly, in case of a vertical synchronization frequency of a 60 Hz, one of the PAL-M mode and the NTSC mode is selected in advance by using a manual selection switch. At this time, when the color television set is in a color state, the selected mode are kept unchanged. When the color television set is not in a color state, a different mode is selected by the manual selection switch. The conventional color television set has a drawback in which one mode for the PAL-N broadcasting system can be automatically selected. However, the others for the PA1-M broadcasting system or the NTSC broadcasting system is to be manually selected.

SUMMARY OF THE INVENTION

Accordingly, it is an object of the present invention to provide an automatic 3-mode switching circuit of a color television set for automatically selecting a mode suitable for each of the PAL-M, PAL-N, and NTSC broadcasting systems which is received by the color television set.

Another object of the present invention is accomplished by: detecting a vertical synchronization frequency of a received broadcasting signal, selecting a mode for the PAL-N system when a detected vertical synchronization frequency is a 50 Hz or a mode for the PAL-M when a 60 Hz is detected for the vertical synchronization frequency, detecting whether a color signal exists or not after a delayed time, keeping the mode for the PAL-M system when the color signal is detected, and selecting a mode for the NTSC system when the color signal is not detected.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an automatic 3-mode switching circuit of a color television set for automatically changing into a suitable system according to broadcasting signals of the broadcasting systems, i.e., PAL-N, NTSC, PAL-M systems, which comprises a color killing section, a color existence/nonexistence discriminating section, a vertical synchronization signal processing section, a 50/60 Hz discriminating section, a control section, a switching section, a NTSC color demodulating section and a NTSC oscillation section, a PAL-M color demodulating section, a PAL-N color demodulating section and a PAL-N oscillation section, and a voltage controlling section.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an operational flowchart of the present invention.

DESCRIPTION OF THE PREFERRED EMBODIMENTS

Figure 1:
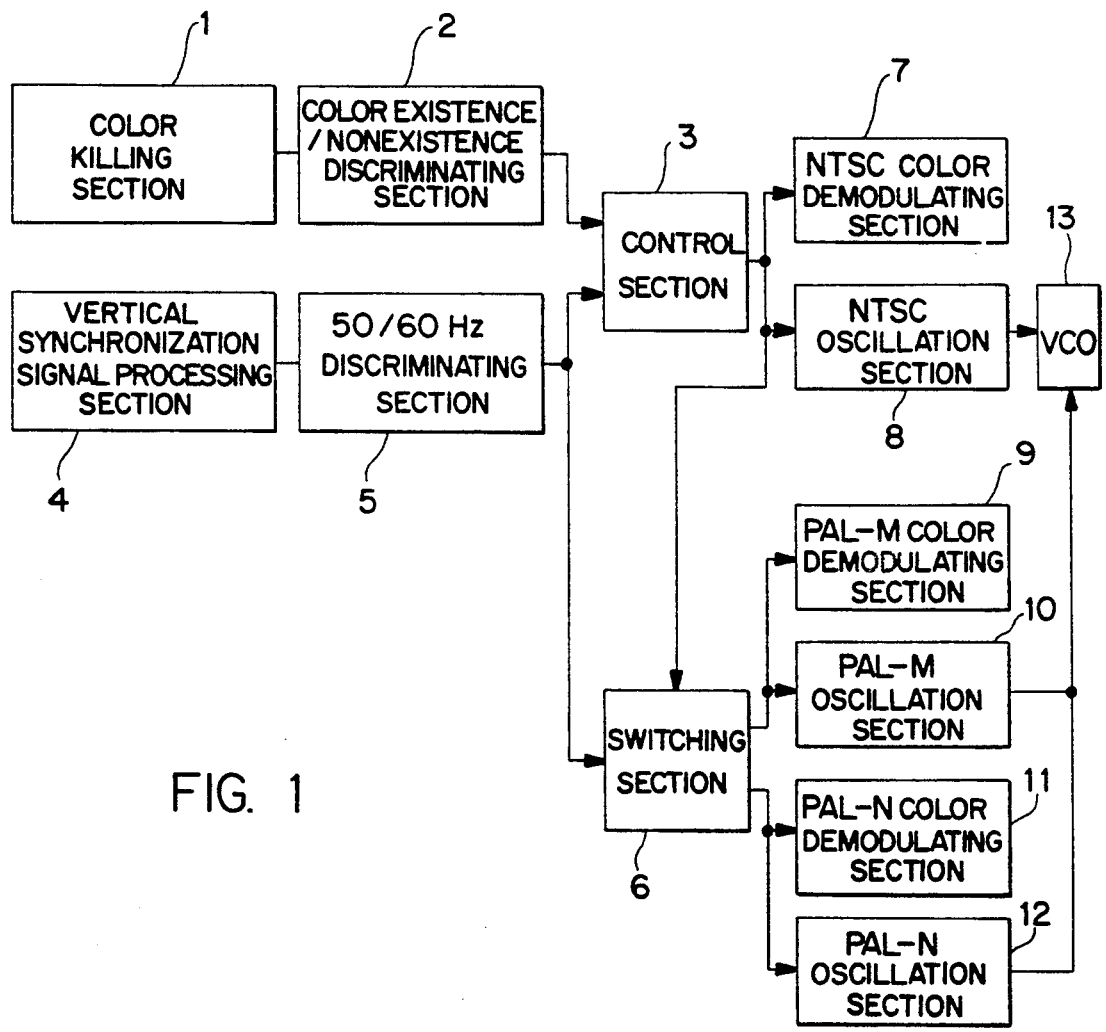
FIG. 1 is a block diagram for an automatic 3-mode switching circuit of a color television set according to the present invention.

Referring to FIG. 1, the automatic 3-mode switching circuit of the present invention comprises a color killing section 1 for generating a voltage difference according to existence or nonexistence of a color signal, a color existence/nonexistence discriminating section 2 for outputting a color existence/nonexistence discriminating signal by converting the output signal of the color killing section 1 to a logic signal, a vertical synchronization signal processing section 4 for processing a vertical synchronization signal for an output, a 50/60 Hz discriminating section 5 for discriminating a vertical synchronization signal frequency of the vertical synchronization signal processing section 4 for an output as a logic signal, a control section 3 for outputting a logic signal in order to select the NTSC mode or the PAL mode by an output signal of the 50/60 Hz discriminating section 5 and the color existence/nonexistence discriminating section 2, a switching section 6 which is enabled by a PAL select signal of the control section 3 for outputting a PAL-N/PAL-M select signal according to the 50/60 Hz discriminating section 5, a NTSC color demodulating section 7 and a NTSC oscillation section 8 which are operated by an NTSC selection signal of the control section 3, a PAL-M color demodulating section 9 and a PAL-M oscillation section 10 which are operated by a PAL-M select signal of the switching section 6, a PAL-N color demodulating section 11 and a PAL-N oscillation section 12 which are operated by a PAL-N selection signal of the switching section 6, and a voltage controlling oscillator 13 which is operated by signals of the oscillation sections 8, 10, and 12.

Figure 2:
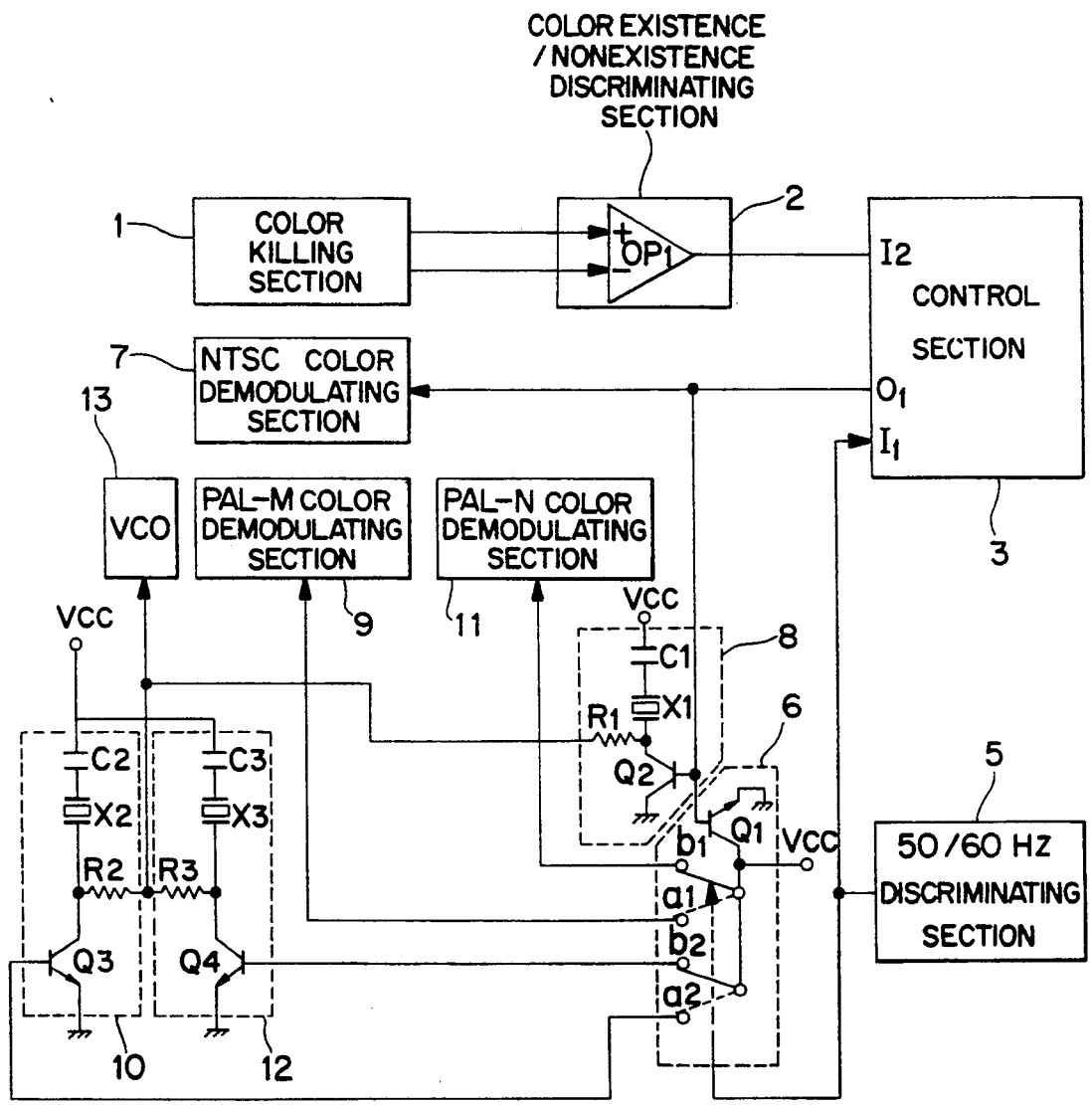
FIG. 2 is a detailed circuit diagram of FIG. 1.

Referring to FIG. 2, the color existence/nonexistence discriminating system 2 is structured with a differential amplifier OP1. The NTSC oscillation section 8 is constructed by a transistor Q2 which is controlled to ON or OFF according to a signal output from the NTSC/PAL selection signal terminal 01 of the control section 3. And a NTSC color subcarrier oscillator X1, a capacitor C1, and a resistor R1 are connected with the collector of the transistor Q2. The switching section 6 is structured with a transistor Q1 controlled to ON or OFF according to a signal output from the NTSC/PA1 selection signal terminal 01 of the control section 3 and switches SW1and SW2 which selectively apply the power source (Vcc) to the PAL-N color demodulating section 11 and PAL-M color demodulating section 9 or to the PA1-N oscillation section 12 and PAL-M oscillation section 10 according to an output state of the 50/60 Hz demodulating section 5 when the transistor Q4 is turned off. The PAL-M oscillation section 10 is built by a transistor Q3 which is controlled to ON or OFF according to a signal of a terminal a2 of the switch SW2. A PAL-M color subcarrier oscillator X2, a capacitor c2, and a resistor R2 are connected with the collector of the transistor Q3. The PAL-N oscillation section 12 is attained by a transistor Q1 controlled to ON or OFF according to a signal of a terminal b2 of the switch SW2, and a PAL-N color subcarrier oscillator X3. And a capacitor c3 and a resistor R3 are connected with the collector of the transistor Q4.

The switches SW1 and SW2 are shortcircuited to the terminals b1 and b2 when a low potential signal as a 50 Hz discriminating signal is outputted from the 50/60 Hz discriminating section 5, and shortcircuited to the terminals a1 and a2 when a high potential signal as a 60 Hz discriminating signal is outputted.

The mode switching circuit of color television of the present invention operates as follows:

When a broadcasting signal of the PAL-N system is received by a color television set, a vertical synchronization signal of a 50 Hz is outputted from the vertical synchronization signal processing section 4, a low potential signal as a 50 Hz discriminating signal is outputted from the 50/60 Hz discriminating section 5, and applied to the 50/60 Hz discriminating input terminal I1 of the control section 3 as well as to control terminals of the switching section 6. Accordingly, at this time, the switches SW1 and SW2 of the switching section 6 are connected to the terminals b1 an b2, a 50 Hz is determined in the control section 3 and a low potential signal as a PAL selection signal is outputted to the NTSC/PAL selection signal terminal 01. Due to this low potential signal, the NTSC color demodulating section 7 is not driven and the transistor Q2 of the NTSC oscillation section 8 is turned off, so that the NTSC color subcarrier oscillator X1 is not driven. At this time, the transistor Q1 of the switching section 6 is turned off by the low potential signal which is outputted from the NTSC/PAL selection signal terminal 01.

As a result, the power source (Vcc) is applied to the PAL-N color demodulating section 11 through the switch SW1 to drive it, the power source (Vcc) turns the transistor Q4 of the PAL-N oscillation section 12 through the switch SW2 to drive the PAL-N color subcarrier oscillator X3, the oscillation signal is applied to the voltage control oscillator (Vco) through the resistor R3 so that the broadcasting signal of the PAL-N system can be demodulated in a normal state.

When a broadcasting signal of the PAL-M system or the NTSC system are received by a color television set, a vertical synchronization signal of a 60 Hz is outputted from the vertical synchronization signal processing section 4, a high potential signal as a 60 Hz discriminating signal is outputted from the 50/60 Hz discriminating section 5, and applied to the 50/60 Hz discriminating input terminal I1 of the control system 3 as well as to control terminals of the switching section 6. Accordingly, at this time, the switches SW1 and SW2 of the switching section 6 are connected to the terminals a1 and a2, a 60 Hz is determined in the control section 3 and a low potential signal as a PAL selection signal is outputted to the NTSC/PAL selection signal terminal 01. Therefore, the NTSC color demodulating section 7 and the NTSC oscillation section 8 are not driven and the transistor Q1 of the switching section 6 is turned off. As a result, at this time, the power source (Vcc) is applied to the PAL-M color demodulating section 9 through the switch SW1 to drive it, the power source (Vcc) turns the transistor Q3 of the PAL-M oscillation section 10 through the switch SW2 to drive the PAL-M color subcarrier oscillator X2. The broadcasting signal of the PAL-M system is demodulated.

At this time, when the broadcasting signal received by a color television set is that of the PAL-M system, a color signal is detected by the color killing section 1 and thus any phase difference does not take place. Therefore, a high potential signal is outputted from the color existence/nonexistence discriminating section 2 to be applied to the color discriminating input terminal I2 of the control section 3. Accordingly, at this time, the control section 3 determines the existence of a color signal and keeps on outputting a low potential signal as a PAL selection signal to the NTSC/PAL selection signal terminal 01. The PAL-M demodulating section 9 and the PAL-M oscillation section 10 keep on driving to normally demodulate the broadcasting signal of the PAL-M system. However, when the received broadcasting signal is that of the NTSC system, a demodulation of the PAL-M system is being performed. Therefore, no voltage difference takes place because a color signal is not detected by the color killing section 1.

Accordingly, a low potential signal is outputted from the color existence/nonexistence discriminating section 2 to be applied to the color discriminating input terminal I2 of the control section 3. When a low potential signal is applied to the color discriminating input terminal I2 for a predetermined time which outputs a low potential signal to the NTSC/PAL selection signal terminal 01, the control section 3 determines the NTSC system and outputs a high potential signal as a NTSC selection signal to the NTSC/PAL selection signal terminal o1. At this time, since the high potential signal turns the transistor Q1 of the switching section 6 on, the ground signal is applied to the moving terminals of the switches SW1 and SW2 not to drive the PAL-M color demodulating section 9 and the PAL-M oscillation section 10. At this time, the broadcasting signal of the NTSC system can be normally demodulated because the NTSC color demodulating signal 7 and the NTSC oscillation section 8 is driven by a high potential signal output to the NTSC/PA1 selection signal terminal 01.

FIG. 3 is a flow chart for operations explained above. The PAL-N system is selected in case of a 50 Hz vertical synchronization signal frequency and the PAL-M system is selected in case of a 60 Hz vertical synchronization signal frequency.

After a predetermined time, the PAL-M system selection is kept when a color signal exists, and the NTSC system is selected when a color signal does not exist.

As described above in detail, the present invention has the effect to give the viewers a more convenience with the automatic selection of the mode suitable for each of the PAL-N, PAL-M and NTSC broadcasting system which is received by the color television set.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An automatic 3-mode switching circuit of a color television set comprising:
    a color killing section for generating a voltage difference according to existence or nonexistence of a color signal,
    a color existence/nonexistence discriminating section for outputting a color existence/nonexistence discriminating signal by converting the output signal of said color killing section to a logic signal,
    a vertical synchronization signal processing section for processing a vertical synchronization signal for an output,
    a 50/60 Hz discriminating section for discriminating a vertical synchronization signal frequency of said vertical synchronization signal processing section for an output as the logic signal,
    a control section for outputting a selection signal of the NTSC mode or the PAL mode by an output signal of said 50/60 Hz discriminating section and said color existence/nonexistence discriminating section,
    a switching section enabled by a PAL selection signal of the control section for outputting a PAL-N/PAL-M selection signal according to said 50/60 Hz discriminating section,
    a NTSC color demodulating section and a NTSC oscillation section which are operated by an NTSC selection signal of said control section,
    a PAL-M color demodulating section and a PAL-M oscillation section operated by a PAL-M selection signal of said switching section,
    a PAL-N color demodulating section and a PAL-N oscillation section which are operated by a PAL-N selection signal of said switching section, and
    a voltage controlling oscillator which is operated by signals of the oscillation sections.

2. The automatic 3-mode switching circuit of a color television set of claim 1, wherein the control section outputs the PAL selection signal when a 50 Hz discriminating signal is outputted from the 50/60 Hz discriminating section, said PAL selection signal is kept in the state that a color discriminating signal is outputted for a predetermined time from said color existence/nonexistence discriminating section after outputting the PAL selection signal for the predetermined time when a 60 Hz discriminating signal is outputted, and the NTSC selection signal is outputted in the state that a color discriminating signal is not outputted.

* * * * *